United States Patent [19]

Lustig

[11] 4,274,742

[45] Jun. 23, 1981

[54] PASSIVE RING LASER RATE OF TURN DEVICES

[75] Inventor: Claude D. Lustig, Lexington, Mass.

[73] Assignee: Sperry Corporation, New York, N.Y.

[21] Appl. No.: 98,467

[22] Filed: Nov. 29, 1979

[51] Int. Cl.³ .............................................. G01C 19/64
[52] U.S. Cl. .................................................... 356/350
[58] Field of Search ................................ 356/350, 351

[56] References Cited

U.S. PATENT DOCUMENTS 4,135,822  1/1979  Ezekiel ................................. 356/350

OTHER PUBLICATIONS

"Passive Ring Resonator Laser Gyroscope," Ezekiel et al., Applied Physics Letters, vol. 30, No. 9, May 1, 1977, pp. 478–480.

Primary Examiner—Vincent P. McGraw
Attorney, Agent, or Firm—Howard P. Terry

[57] ABSTRACT

Passive ring resonators utilize counter-rotational beams of electromagnetic energy to sense the rate of rotation of the passive ring through detecting a consequence of the shift in resonator frequency induced by such rotation. The clockwise and counter-clockwise resonant frequencies are oscillated between respective first and second values. Detectors produce signals indicative of the amplitudes of the first and second beams. Algebraic combinations of the amplitude signals are used to generate a rotational rate signal.

17 Claims, 9 Drawing Figures

PASSIVE RING LASER RATE OF TURN DEVICES

BACKGROUND OF THE INVENTION

1. Field of the Invention

The present invention relates to passive ring resonators utilizing counter-rotational beams of electromagnetic energy to sense the rate of rotation of such resonators through the shift in resonant frequency induced by the rotation.

2. Description of the Prior Art

Ring resonators of the prior art normally include an active lasing medium disposed therewithin to direct light waves emitted in the active medium in opposite directions around a closed loop, normally planar path. The counter-rotating light beams form an effective standing wave pattern and oscillate at the same frequency when their respective path lenghts are equal and at different frequencies when the path lengths are unequal because of rotation of the path loop about an axis generally perpendicular to the propagation plane of the light waves. Through the detection of this frequency difference, the active ring laser of the prior art is enabled to sense the rate of rotation of its path loop and has thus found wide acceptance in navigation and guidance applications. The prior art ring laser rate of turn device is particularly well suited to modern navigation and guidance systems employing high speed data processing because it can be turned on very rapidly and does provide virtually instantaneous response to input rotation rate changes. Typical practical forms of such ring laser devices are disclosed in the following U.S. Pat. Nos. assigned to the Sperry Corporation.

- C. C. Wang—3,382,758 for a "Ring Laser Having Frequency Offsetting Means Inside Optical Path", issued May 14, 1968,
- W. M. Macek—3,382,759 for a "Ring Laser Biased by Zeeman Frequency Offset Effect for Sensing Slow Rotations", issued May 14, 1968,
- W. M. Macek—3,382,760 for a "Coherent Light Frequency Difference Sensor", issued May 14, 1968,
- W. M. Macek—3,508,831 for a "Ring Laser Having Minimized Frequency Locking Characteristic", issued Apr. 28, 1970,
- W. M. Macek—3,486,130 for a "Ring Laser Having a Quarter Wave Plate for Rotating the Plane of Polarization of Light Which is Reflected Back into the Ring From the Combining Optics", issued Dec. 23, 1969, and
- W. M. Macek—3,480,878 for a "Ring Laser With Means for Reducing Coupling to Backscattered Waves", issued Nov. 25, 1969.

Certain of the foregoing patents, among others, testify to the fact that such active ring rate of turn laser devices, i.e., those having an internal gain mechanism within the ring, demonstrate undesired mode locking phenomena proximate the zero rate of rotation situation. In this condition, the measured output frequency undesirably remains constant over a small range of rates of rotation including and on each side of zero rate of turn. Accordingly, measures must be taken to overcome this effect, such as by the use of mirrors in the laser ring resonator designed to minimize back scatter and by the use of rate biasing techniques which induce a significant difference in frequency between the counter-rotating beams, preventing mode locking at the zero rate of turn condition.

Passive ring rate of turn measurement devices, i.e., those containing no active gain element within the measuring ring or loop, have been recently demonstrated, as reported by S. Ezekiel and S. R. Balsamo, "Passive Ring Resonator Gyroscope", Applied Physics Letters, Vol. 30, page 478 (1977). Related material is presented by the S. Ezekiel U.S. Pat. No. 4,135,822, issued Jan. 23, 1979 for a "Laser Gyroscope". Since the passive ring device does not include a gain medium within its passive ring, some of the problems associated with the presence of such a gain medium are easily avoided. However, prior art passive ring resonator devices have used detection schemes wherein each of the counter-rotating beams is measured and, by means of one or more closed loop feedback schemes, the frequency characterizing at least one of the counter-rotating light beams is adjusted to a predetermined value. There is no attempt to generate a useful rotation rate output signal until this adjustment is accomplished by the feed back apparatus. While fast acting components for such feedback servo schemes are available, the noise introduced in practice by the use of such components increases with increasing speed of response, introducing a significant source of error into the rate of turn system. Accordingly, prior art passive resonator rate of turn devices do not match the capabilities of high speed data processor systems normally employed in precision navigation. Furthermore, the need to adjust the frequency of at least one of the light beams in the ring requires interaction with frequency adjusting elements which may in themselves drift due to environmental conditions, injecting further errors into the output rate of turn signal.

SUMMARY OF THE INVENTION

In the present invention, a ring laser is provided having a means forming a passive resonator for the propagation of clockwise and counter-clockwise beams of electro-magnetic energy. The clockwise and counter-clockwise resonant frequencies are oscillated between respective first and second distinct values. Detector means is provided for producing signals with amplitudes indicative of the amplitudes of the first and second beams. A further means is coupled with the detector means for producing a rotation rate signal proportional to the algebraic combination of the signals indicative of the amplitudes of the first and second beams. By dispensing with closed loop feedback arrangements to provide an output signal indicative of rotation rate, the present invention provides very rapid response to changes in the rotation rate of the passive resonator and is thus well adapted for use with high speed data processors. Moreover, the clockwise and counter-clockwise resonant frequencies need not be adjusted precisely to the frequency of either counter-rotating beam.

DESCRIPTION OF THE PREFERRED EMBODIMENTS

Figure 1:
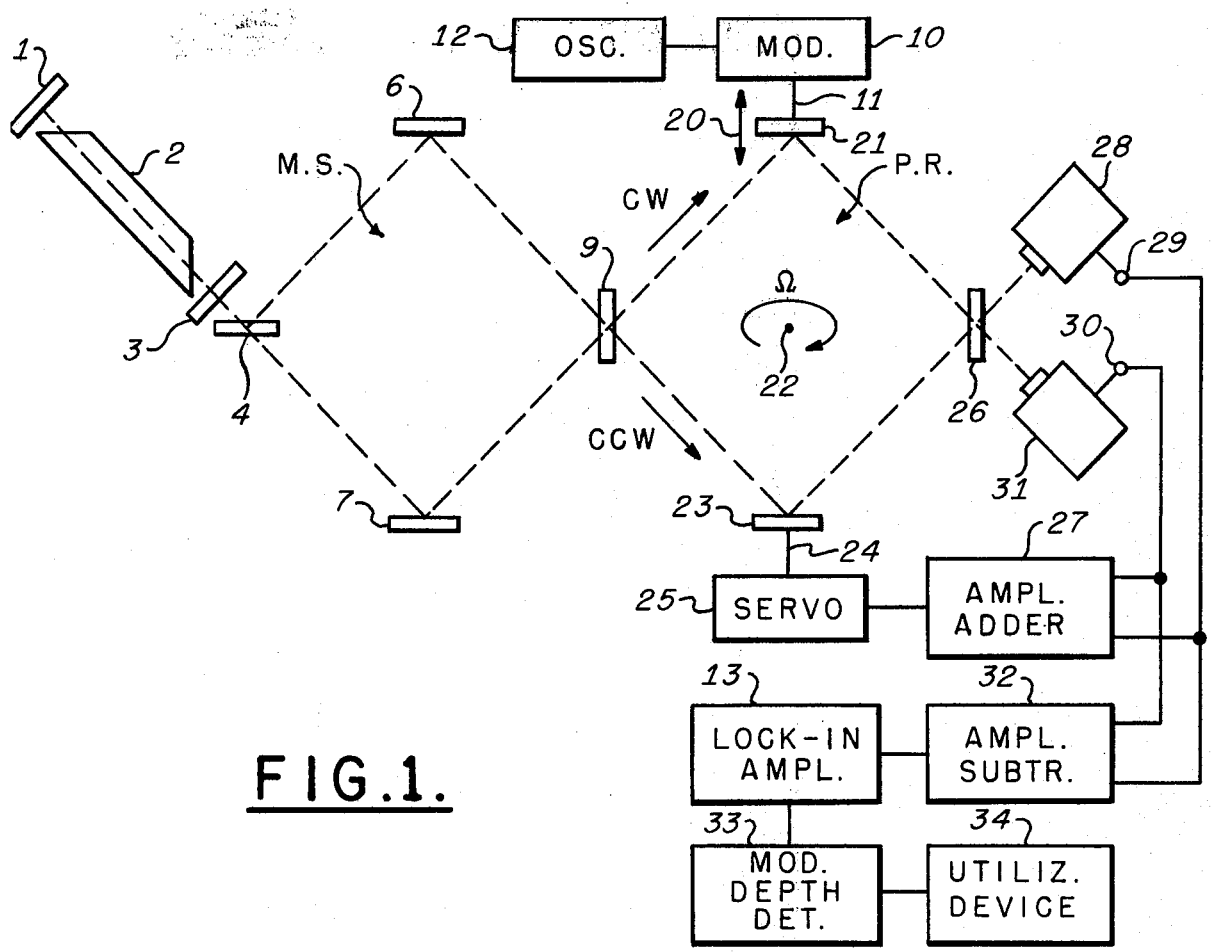
FIG. 1 is a diagram of a typical embodiment of the invention for sensing physical rotation.

In the several embodiments, the passive rate of turn measuring ring P.R. is defined by mirrors equivalent to mirrors 9, 21, 23, 26 normally equally spaced about and facing a center 22 around which rotation of the passive ring occurs at a predetermined rate $\Omega$, as is illustrated in FIG. 1. It is understood that the mirrors 9, 21, 23, 26, as well as other elements yet to be described are, for instance, affixed to the frame of a craft to be navigated with the cooperation of the invention. Optical excitation of the passive measuring ring P.R. is supplied by a single laser oscillator illuminating a mirror system M.S. designed to produce beams of electromagnetic energy appropriately directed for coupling to clockwise and counter-clockwise resonances in the passive measuring ring P.R. The conventional laser element 2 with the usual oscillation sustaining end mirrors 1 and 3, mirror 3 being only partially reflecting, is tuned to operate at a single frequency. The mirror system M.S. is formed by fully reflecting mirrors 6 and 7 in cooperation with divider 4 and partially reflecting mirror 9. Thus, the necessary light beams for exciting the passive ring P.R. are derived from a single laser source 1, 2, 3 by the mirror system M.S. using an optical transmission power dividing element 4. In this manner, the problem of uncoordinated phase and frequency jitter of beams arising from separate laser sources is avoided. When the two light beams are formed in FIG. 1, they desirably depart from beam splitter 4 along different paths and therefore the opposed fully reflecting mirrors 6 and 7 are used to introduce them through partially reflecting mirror 9 into the passive ring P.R. The beams flow therein in opposite directions about ring P.R., portions of the counter-flowing optical energy passing through partially reflecting mirror 26 into photodetectors 28, 31. Amplitude detector 28 is associated with the counter-clockwise light flow, while amplitude detector 31 is associated with the clockwise flow. It will be appreciated that rotation of the passive ring resonator does not induce changes in the frequency characterizing the clockwise and counter-clockwise beams. This frequency shift phenomenon is limited to active laser ring devices where the ring is a resonator, rotation inducing an effective change in resonator length and thus shifting the resonant output frequencies of the ring laser system.

Figure 2:
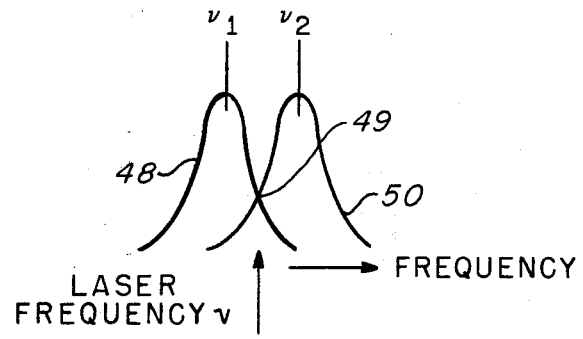

The amplitude modulator 10, through a mechanical or other linkage 11, is employed to vary the position of totally reflecting mirror 21 with respect to center of rotation 22. Thus, a modulation is introduced from oscillator 12 into the passive ring resonator P.R., so that the effective resonant frequency response is varied between overlapping resonant frequency responses 48 and 50, respectively centered at $\nu_1$ and $\nu_2$, such that the laser frequency 49 is located at the crossover of the linear regions of the responses 48 and 50, as shown in FIG. 2. The desired modulation may be introduced into the passive ring resonator P.R. by cyclically moving mirror 21 in the sense of arrow 20 using a piezoelectric or magnetostrictive transducer of the type well known in the art as the modulator 10. Alternatively, a magnetic field sensitive mirror may be used for mirror 21 of the kind described, for example, by W. M. Macek in the U.S. Pat. No. 3,851,973 for a "Ring Laser Magnetic Bias Mirror Compensated for Non-Reciprocal Loss", issued Dec. 3, 1974 and assigned to Sperry Corporation. Other path length modulation devices are liberally described in the literature, including Faraday cells which may be introduced in the path of the passive ring P.R.

For simplicity, the nature of the several alternatives will first be discussed in connection with FIG. 1, assuming piezoelectric mirror modulation. The totally reflecting mirror 23 opposite mirror 21 is controlled for this purpose by linkage 24 and positioner or servo 25, the latter making use of the two detected amplitudes found on terminals 29, 30 of the respective photodetectors 28, 31. These detected signal amplitudes are added in adder 27 for servo control of the position of mirror 23 in a manner yet to be described. However, the same result may be achieved by the positional control of one of the laser mirrors 1, 3. In FIG. 1, the position of mirror 23 with respect to center 22 is servo-adjusted so that the passive ring resonances $\nu_1$ and $\nu_2$ corresponding to the outer and inner positions of mirror 21 overlap at the operating frequency of laser 1, 2, 3 in the absence of any rotation of the passive ring P.R. Now, the piezoelectric modulation of the position of mirror 21 causes the resonant responses to vary between the respective response curves centered at frequencies $\nu_1$ and $\nu_2$ which are located on either side of the operating frequency $\nu$ of laser 1, 2, 3 as shown in FIG. 2.

Figure 3:
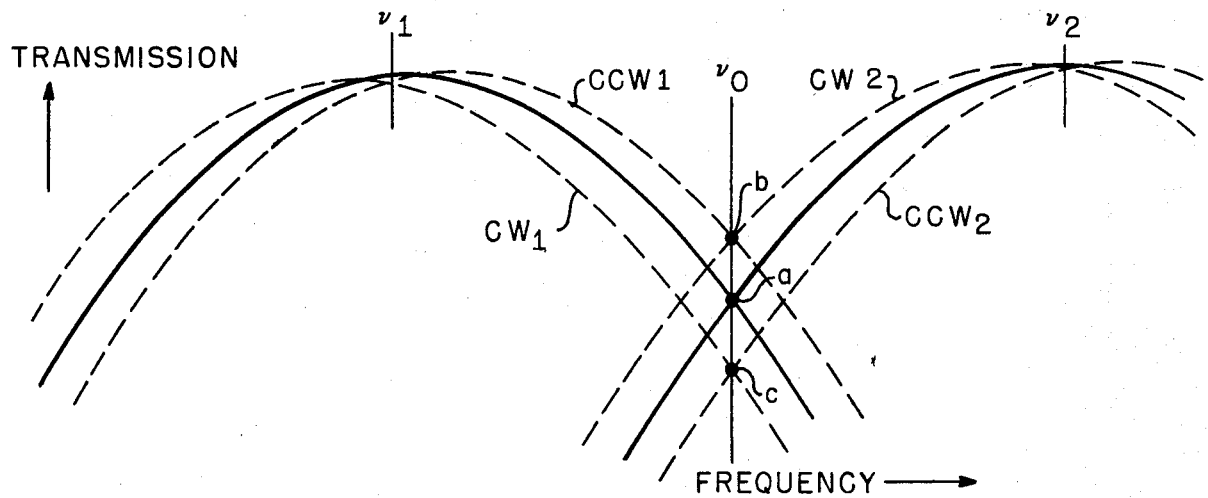
Figure 4:
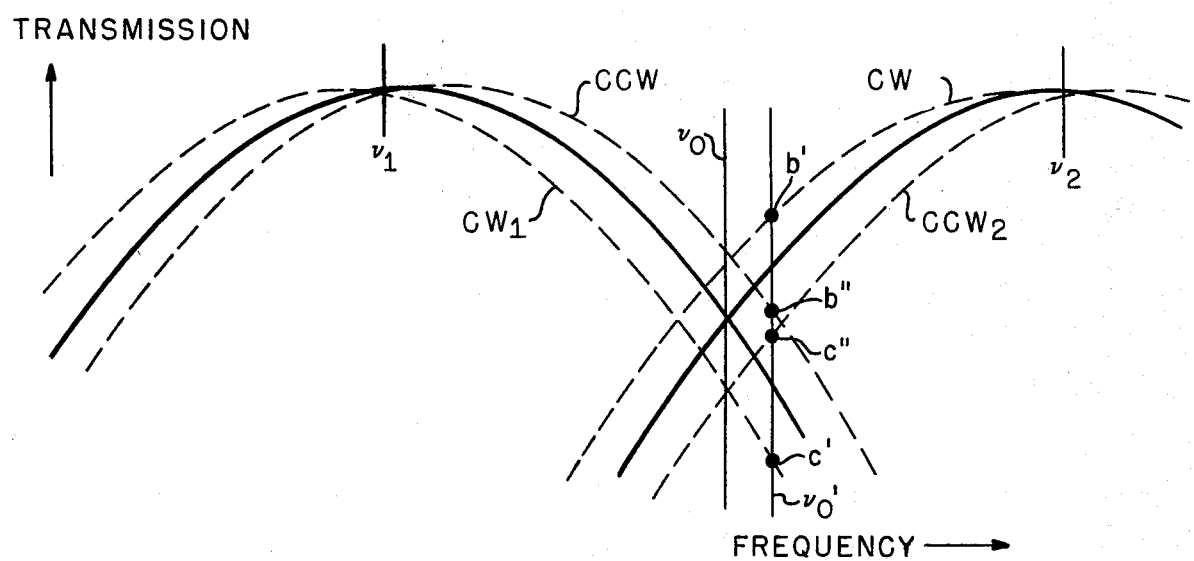

If a component of rotation of ring P.R. about center 22 in introduced, the effect is to alter the clockwise and counter-clockwise resonant responses slightly from those centered at the frequencies $\nu_1$ and $\nu_2$ (FIG. 3). If the laser (1, 2, 3) frequency incident on ring P.R. is exactly $\nu_0$ and if there is no ring P.R. rotation, the output signal level for both the clockwise mode photodetector 31 and the counter-clockwise mode photodetector 28 is the signal level (a) of FIG. 3; this is true for both the inner and outer positions of the piezoelectric driven modulating mirror 21. With turning of the passive ring P.R. about center 22, the single resonances at $\nu_1$ and $\nu_2$ are each split into two modes; the resonance at $\nu_1$ is split into two modes $cw_1$ and $ccw_1$ and the resonance at $\nu_2$ is likewise split into two modes $cw_2$ and $ccw_2$. In this case, clockwise photodetector 31 of FIG. 1 has an output varying from (b) to (c) in FIG. 3 and the counter-clockwise photodetector 28 has an output varying from (c) to (b); i.e., the amplitudes of the detector signals are the same, but are opposite in phase. Of particular interest is the case in which the input laser (1, 2, 3) frequency is displaced slightly from frequency $\nu_0$ to a new value $\nu_0'$ not symmetrically placed between peaks $\nu_1$ and $\nu_2$ as shown in FIG. 4. Then, the output of the clockwise photodetector 31 goes from (b') to (c'), which represents a larger excursion than the (b) to (c) amplitude. Likewise, the output of counter-clockwise photodetector 28 is from (c'') to (b''), which is smaller than the (c) to (b) amplitude.

Figure 5:
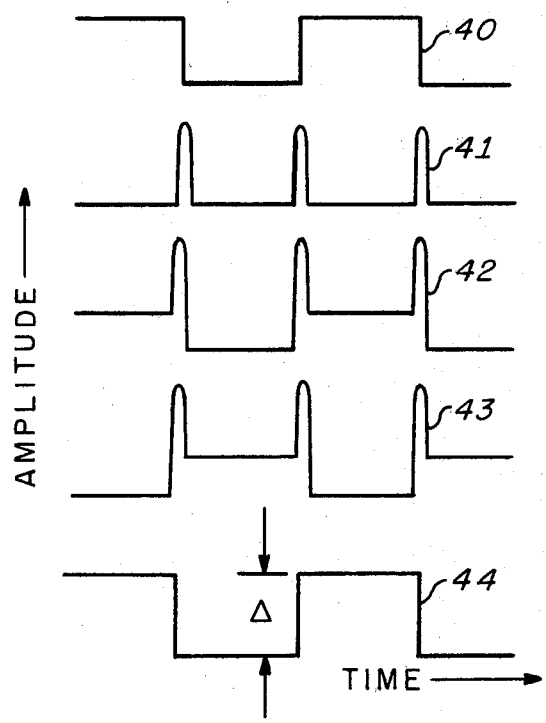
FIGS. 2 through 6 are graphs useful in explaining the operation of the invention.

In operation with the laser (1, 2, 3) input frequency equal to $\nu_0$, the graph 40 in FIG. 5 represents the instantaneous cyclically alternating inner and outer positions of piezoelectric mirror 21 as a function of time. Wave form 41 represents the outputs from each of the photodetectors 28, 31 for no rotation of the passive ring P.R. On the other hand and in the presence of actual rotation of ring P.R., wave trains 42 and 43 are the respective instantaneous outputs of the clockwise photodetector 31 and of the counter-clockwise photodetector 28. If wave 43 is subtracted from wave 42, the instantaneous wave train 44 results, where the resulting depth of modulation $\Delta$ is proportional to the instantaneous passive ring rotation rate about center 22. Wave train 44 may be subjected to processing by a conventional lock-in amplifier 13 and a circuit 33 for measuring its modulation depth Δ and the consequent signal representative of rate of turn is then applied to utilization device 34, which may be a conventional display, navigation computer and control, or data processing device. The several wave trains 41 through 43 are superimposed on a large bias level which is substantially reduced in wave form 44 as a result of the subtraction of wave forms 42 and 43. In addition, it is recognized that the several wave trains 40 through 44 will be rounded off in practice, due to the finite time constant associated with the piezoelectric mirror modulation.

If $\nu'$ is not at the cross-over frequency of the response curves centered at $\nu_1$ and $\nu_2$ as in FIG. 4, the depth of modulation on wave form 42 is increased when the ring P.R. is rotated, while the depth of modulation on wave 43 is reduced, but the depth of modulation Δ on the difference wave form 44 is unchanged. Furthermore, the sum of the output amplitudes of photodetectors 28 and 31 is proportional to $(\nu_0 - \nu_0')$. That sum can therefore be generated by amplitude adder 27 whose output is directed to the conventional servo 25 to maintain the crossover frequency of the response curves close to the output frequency $\nu_0$ of laser 1, 2, 3. Such control may be exercised through a conventional servo controlled mechanical or other link 24 interposed between mirror 23 and servo 25. Alternatively, the output of the servo could be directed through a suitable link to control the position of mirror 1 or mirror 3 in order to maintain the output frequency $\nu_0$ of laser 1, 2, 3 close to the average resonator frequency $0.5 (\nu_1 + \nu_2)$.

Figure 6:
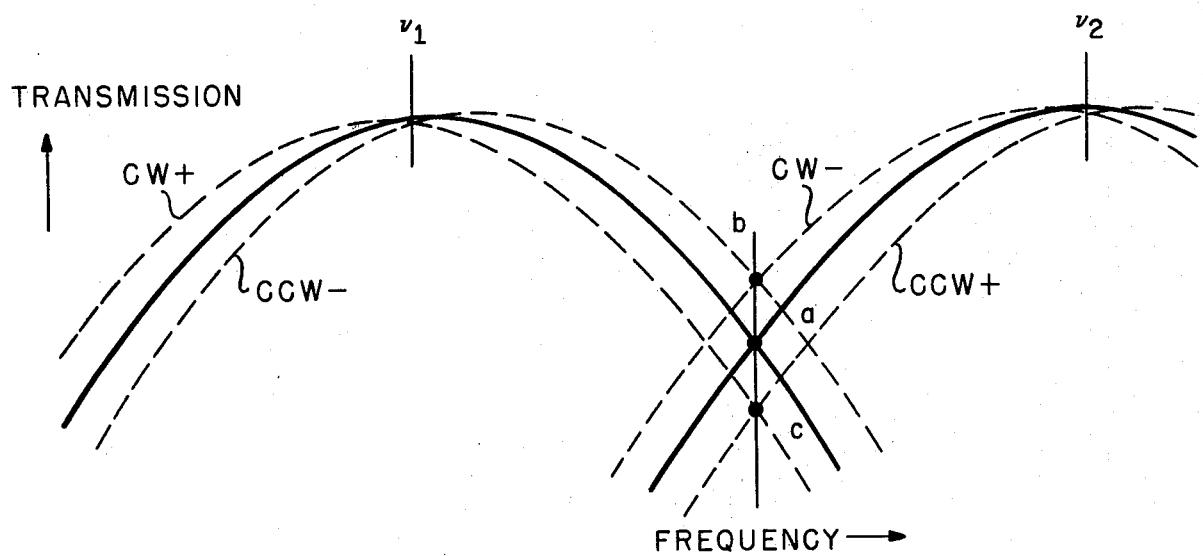

If a magnetic field controlled mirror is substituted at 21 in FIG. 1 for the foregoing piezoelectric mirror to inject modulation into the passive ring P.R. when the latter is not rotating, clockwise and counter-clockwise modes are established in the passive ring whose respective responses centered at frequencies $\nu_1$ and $\nu_2$ interchange as the magnetic field within the magnetic mirror is reversed. FIG. 6 must now be substituted for FIG. 3 in explaining operation with the magnetic mirror. In FIG. 6, the legends cw+ and ccw+ represent the resonant modes for one magnetic-mirror field direction, while cw− and ccw− represent the modes with the field direction reversed. In contrast to the situation in which the piezoelectric modulator is used, it is now the depth of modulation on the sum of the amplitudes of the outputs from amplitude detectors 28, 31 which is proportional to the rate of ring rotation Ω for the laser frequencies:

$$\nu_0 = 0.5 (\nu_1 + \nu_2) \text{ and } \nu_0' \neq \nu_0 \qquad (1)$$

At the same time, the difference between the amplitudes of the outputs of photodetectors 28, 31 is now proportional to the value $\nu_0 - \nu_0'$ and is used to control servo 25. This interchange may be represented in FIG. 1 by interchanging the labels "AMPL. ADDER" and "AMPL. SUBTR." in blocks 32 and 27. The modulation on the sum of the amplitudes of the outputs from detectors 28 and 31 will be superimposed on a large bias level and will contain also large amplitude high frequency components of the type shown in wave forms 42 and 43. The amplitudes of both the bias level and the high frequency components will be greatly reduced by filters within the lock-in amplifier 13 and, if necessary, can be further reduced by additional filtering before the signal is applied to lock-in amplifier 13.

In order to allow sampling by the associated computer or other utilization device 34 of the rotation rate Ω at a sufficiently rapid rate, such as about 100 times per second, the modulation rate of the signal supplied by modulation oscillator 12 may be about 10 kHz for either the piezoelectric or magnetic mirror transducers. A conventional lock-in amplifier 13 tuned to the kHz rate is used to provide a signal for the modulation depth detector 33. Lock-in amplifier 13 is used for the frequency difference signal when a piezoelectric mirror is used at 21, as well as for the frequency sum signal when the magnetically driven mirror is substituted at 21.

In FIG. 1, the difference between the frequencies detected by photodetectors 28, 31, is:

$$\Delta f = 4 A\Omega/\lambda P \qquad (2)$$

where, in compatible units:
- A is the area of the passive ring P.R.,
- P is its perimeter,
- λ is the wavelength of the laser source 1, 2, 3, and
- Ω is the rotation rate of the passive ring P.R.

The sensitivity of the configuration depends strongly on the width of the passive ring resonance Δω. If it is assumed that the resonant response of the passive ring has the same frequency dependence as the resonant response of a conventional Fabry-Perot resonator, then the slope of the substantially linear part of the passive ring resonant response is:

$$\frac{DV}{df} = 1.4 \, V_0/\Delta\omega \qquad (3)$$

where
V₀ is the voltage at the resonance peak.
It may properly be assumed that the minimum detectable lock-in amplifier (13) signal is:

$$\Delta V_{min} = V_0/G \qquad (4)$$

which, by definition, represents the input signal to amplifier 13 that will cause an output signal just equal to the r.m.s. noise voltage level. The parameter G is acutally a function $G(\tau)$ of the inherent integration time constant $\tau$ of lock-in amplifier 13. Since the amplitude of the input to lock-in amplifier 13 is twice that of the modulated signal at each photodetector 28, 31 and since the noise level obtained by combining the outputs of photodetectors 28, 31 increases by $\sqrt{2}$, the minimum detectable resonance shift $\Delta f_{min}$ is obtained from equation (3) with $dV = \Delta V_{min}/\sqrt{2}$. Thus:

$$\Delta f_{min} = \Delta V_{min} \Delta\omega / 1.4 \sqrt{2} \, V_0 \qquad (5)$$

$$= \Delta\omega / 2G(\tau)$$

As noted, the sensitivity of the rate of turn measurement system depends strongly upon the width of the passive ring resonance:

$$\Delta\omega = c/PF \qquad (6)$$

where:
- c is the velocity of light,
- P is the passive ring perimeter, and
- F is a dimensionless quality factor for the effective resonator defined as the ratio of the frequency difference between the adjacent resonances to the width Δω of each resonance.

From Equations (2), (5), and (6) the minimum detectable rotation rate is readily derived:

$$\Omega_{min} = \lambda c / 8 A F G (\tau) \quad (7)$$

It will be observed that $\Omega_{min}$ is a reciprocal function of the square of the lineal dimension of the passive ring (or l/A), and not to the first power of that linear dimension (or $1/\sqrt{A}$) as is normally true of prior art passive ring systems.

Figure 7:
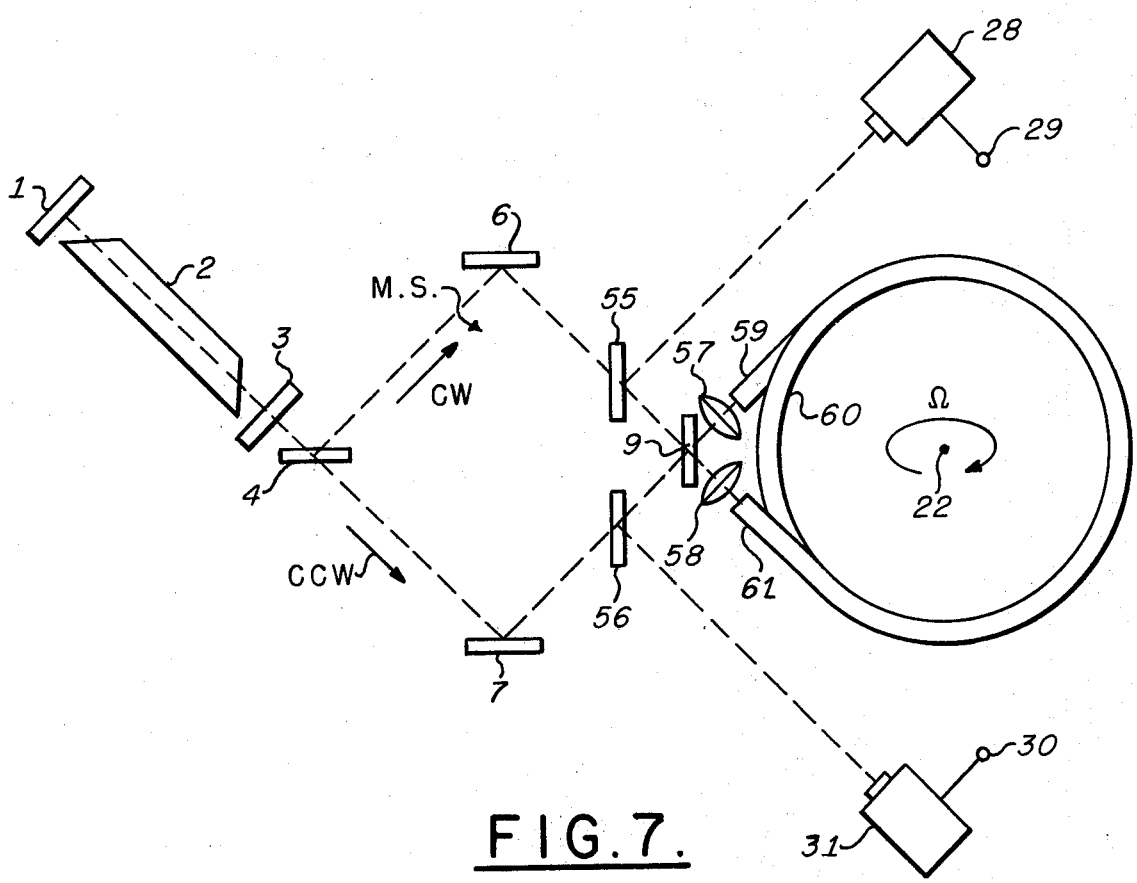
FIGS. 7 and 8 represent diagrams of two further embodiments of the invention.

With respect to FIG. 7, an embodiment is illustrated wherein the minimum sensitivity $\Omega_{min}$ is greatly improved. In this figure, reference numerals applied to corresponding elements in the FIG. 1 embodiment are again employed. Further, it will be apparent to those skilled in the art that the FIG. 7 embodiment is intended normally to operate with position modulation of mirror 9 with a cooperating servo 25 and linkage 24 like those of FIG. 1, or with the servo used to control mirror 1 or mirror 3. In FIG. 7, laser 1, 2, 3 injects light energy through beam splitter 4 directly into the mirror system M.S. comprising fully reflecting mirrors 6, 7 and partially reflecting mirror 9.

The system of FIG. 7 enjoys a greatly improved sensitivity by employing as the passive ring P.R. a multiple turn ring 60 in which use is made of multiple passes of the contra-flowing light beams around the same physical space. The clockwise wave is focussed by lens 57 into the end 59 at the first turn of a fiber optic wave guide forming the multi-turn coil 60 and ultimately passes out of the nth turn of the coil 60 at end 61, whereupon it is focussed by lens 58 back into the mirror system M.S. through mirror 9. In a similar manner, the counter-clockwise wave is focussed by lens 58 into the end 61 at the nth turn of multi-turn coil 60 and ultimately passes out of the first turn of coil 60 at end 59, whereupon it is focussed by lens 57 back into the mirror system M.S. through mirror 9. The respective beam splitters 55, 56 sample a fraction of the returning beams and couple the fractions into the respective clockwise photodetector 28 and the counter-clockwise photodetector 31.

Equation (2) for $\Delta f$ remains the same for the resonance condition in FIGS. 1 and 7. However, the width of the passive ring resonance curve is rapidly reduced with increasing the numbers of turns of coil 60, provided that the quality factor F remains unchanged. For n turns of coil 60 and n passes therein of the light beams around the same area, the former Equation (6) for the resonance width becomes:

$$\Delta \omega = c / n \, P \, F \quad (8)$$

Thus, the original Equation (7) becomes:

$$\Omega_{min} = \lambda c / 8 \, n \, A F G \, (\tau) \quad (9)$$

By way of example, if 10 turns are used in coil 60, the value of $\Omega_{min}$ is 0.16° per hour for a coil enclosing the same area as a 10 centimeter sided passive ring and 0.64° per hour for a coil enclosing the same area as a 5 centimeter sided passive ring.

In addition, the embodiment of FIG. 7 may be realized in several ways. Multiple passes in coil 60 may be simulated by forming a continuous succession of square resonant paths from tilted corner mirrors and by sending the laser light beam into the consequent ring resonator at a small finite angle with respect to the normal to the mirrors, with an additional array of tilted return mirrors to send light back into the original plane. The necessary modulation can be introduced by using a piezoelectric transducer to move the partly reflective mirror 3 back and forth with respect to the input beam splitter 4. Alternatively, the modulation may be produced at the partially reflective mirror 9 in the manner described in connection with mirror 23 of FIG. 1.

Figure 8:
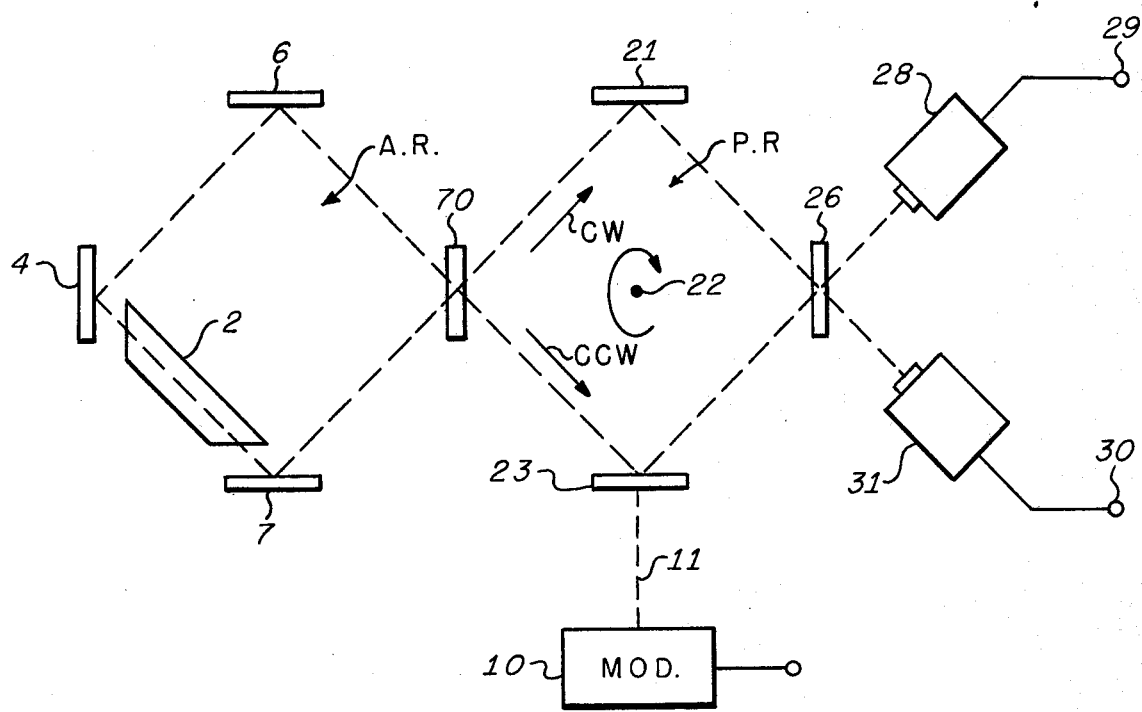

FIG. 8 illustrates an embodiment of the invention similar to that of FIG. 1 and corresponding reference numbers are used for corresponding components. To set up the clockwise and counter-clockwise beams in passive ring resonator P.R., the laser 2 is now placed in an alternative position to form an active loop or ring A.R. with the assistance of mirrors 4, 6, 70, and 7. The passive ring P.R. utilizes mirrors 70, 21, 26, 23 and the previously discussed photodetectors 28, 31 and associated processing circuits are again employed. In the FIG. 8 configuration as well as those of FIGS. 1 and 7, the major source of error lies in very small differences in frequency between the clockwise and the counter-clockwise resonances even when the passive ring is stationary. It is apparent that such undesired small frequency differences may appear if the optical paths vary or if the coupling to the opposite flowing modes is not maintained identically.

In the embodiment of FIG. 8, a relatively large amount of back scatter is deliberately introduced into active ring A.R. to hold the clockwise and counter-clockwise modes in permanently fixed relation by achieving a mode-locked condition in the active ring A.R. This arrangement affords enhanced stability in the coupling to the clockwise and counter-clockwise resonances in the passive ring P.R.

Figure 9:
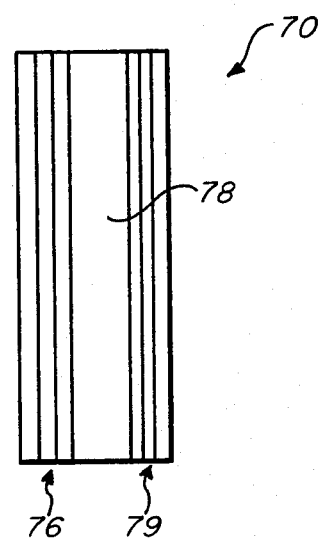
FIG. 9 is a detailed illustration of a component of the FIG. 8 embodiment.

Mirror 70 of FIG. 8 has the special configuration shown in FIG. 9. The major or substrate part of mirror 70 is a glass layer 78 having a succession of dielectric layers 79 to form a surface that is highly reflecting and partially transmitting. On the surface of plate 78 opposite layers 79, a different succession of suitable dielectric layers 76 is formed to provide an anti-reflection coating. The thicknesses and compositions of the dielectric layers are determined by techniques which are well known to those skilled in the art.

Accordingly, it is seen that the present invention overcomes the defects of the prior art by providing rate of turn measurement devices including passive ring resonators utilizing counter-rotational beams of electromagnetic energy to sense the rate of rotation of the resonator through measurement of the shift in resonant frequency induced by such rotation. In particular, the novel passive ring laser is provided having a means forming a passive resonator for the propagation of clockwise and counter-clockwise beams of electromagnetic energy. The clockwise and counter-clockwise resonant frequencies are oscillated between respective first and second frequencies. Detector means are provided for producing signals indicative of the amplitudes of the first and second beams. A further means is coupled with the detector means for producing a rotation rate signal proportional to the algebraic combination of the signals indicative of the amplitudes of the first and second beams. By dispensing with the closed loop feedback devices, the present invention provides very rapid response to change in the rotation rate of the passive resonator and is thus well adapted for use with high speed data processors. Moreover, the clockwise and counter-clockwise resonant frequencies need not be adjusted precisely to the frequency of either of the counter-rotating beams.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. A passive ring resonator rate of turn device including:
    first mirror means forming passive resonator means for the propagation of clockwise and counter-clockwise beams of electromagnetic energy and having clockwise and counter-clockwise resonant frequencies,
    source means for introducing said clockwise and counter-clockwise beams into said passive resonator means,
    modulator means for oscillating said clockwise and counter-clockwise resonant frequencies between respective first and second frequencies,
    detector means for producing signals representative of the instantaneous amplitudes of said clockwise and counter-clockwise beams,
    circuit means responsive to said detector means for producing an output representative of an algebraic combination of the amplitudes of said clockwise and counter-clockwise beams, and
    utilization means responsive to said circuit means output.

2. Apparatus as described in claim 1 wherein said source means includes:
    second mirror means for directing said clockwise and counter-clockwise beams into said first mirror means, and
    laser means external of said first and second mirror means for exciting said second mirror means.

3. Apparatus as described in claim 1 wherein said source means includes:
    second mirror means forming active mode-locked resonator means such that said clockwise and counter-clockwise beams have the same frequency, and
    laser means internal of said active mode-locked resonator means for excitation thereof.

4. Apparatus as described in claim 1 wherein said source means includes:
    optical beam splitter means forming input means to said passive resonator means, and
    laser means for directly exciting said passive resonator means via said optical beam splitter means.

5. Apparatus as described in claim 1 wherein said modulator means comprises:
    vibratable mirror means forming one mirror of said first mirror means, and
    means for vibrating said one mirror means substantially perpendicular to its reflecting surface.

6. Apparatus as described in claim 5 wherein said means for vibrating said vibratable mirror means comprises piezoelectric transducer means.

7. Apparatus as described in claim 5 wherein said means for vibrating said vibratable mirror means comprises magnetoelectric means.

8. Apparatus as described in claim 6 wherein said circuit means includes means for subtracting said amplitudes of said clockwise and counter-clockwise signals.

9. Apparatus as described in claim 8 wherein said circuit means includes means for adding said amplitudes of said clockwise and counter-clockwise signals.

10. Apparatus as described in claim 9 further including:
    movable mirror means forming a second of said first mirror means, and
    servo means responsive to said adding means for positioning said movable mirror means in a direction substantially perpendicular to its reflecting surface.

11. Apparatus as described in claim 10 further including servo means for altering the frequency of operation of said source means in response to said adding means.

12. Apparatus as described in claim 1 wherein said circuit means includes modulation depth detection means for providing an output representative of the rate of rotation of said passive ring resonator rate of turn device.

13. Apparatus as described in claim 1 wherein said first mirror means forming passive resonator means includes at least one partially transmitting reflector for clockwise and counter-clockwise beams opposite said source means.

14. Apparatus as described in claim 13 further including:
    multiple turn coiled optical wave guiding means having first and second ends,
    means for projecting said clockwise and counter-clockwise beams into said respective ends whereby the sensitivity of said apparatus is improved in proportion to the number of said turns.

15. Apparatus as described in claim 14 further including additional mirror means for sampling said clockwise and counter-clockwise beams for activating said detector means.

16. Apparatus as described in claim 3 wherein said passive resonator means and said active mode-locked resonator means are coupled by partially reflecting mirror means for stabilizing the operation thereof.

17. Apparatus as described in claim 1 wherein said modulator means comprises a magnetic field sensitive mirror.

* * * * *